United States Patent
Van Der Lans et al.

(10) Patent No.: US 9,121,982 B2
(45) Date of Patent: Sep. 1, 2015

(54) LIGHT-EMITTING DEVICE FOR EMITTING DIFFUSE LIGHT

(75) Inventors: Dorien Cato Van Der Lans, Eindhoven (NL); Bart Andre Salters, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/876,855

(22) PCT Filed: Oct. 3, 2011

(86) PCT No.: PCT/IB2011/054331
§ 371 (c)(1),
(2), (4) Date: Mar. 29, 2013

(87) PCT Pub. No.: WO2012/046176
PCT Pub. Date: Apr. 12, 2012

(65) Prior Publication Data
US 2013/0182458 A1 Jul. 18, 2013

(51) Int. Cl.
*F21V 7/04* (2006.01)
*F21V 8/00* (2006.01)

(52) U.S. Cl.
CPC ............ *G02B 6/0045* (2013.01); *G02B 6/0035* (2013.01); *G02B 6/0078* (2013.01); *G02B 6/0036* (2013.01); *G02B 6/0043* (2013.01); *G02B 6/0061* (2013.01)

(58) Field of Classification Search
USPC .......... 362/613, 615, 616, 618–620, 627, 628
See application file for complete search history.

(56) References Cited

U.S. PATENT DOCUMENTS

| | | | |
|---|---|---|---|
| 2006/0221638 A1 | 10/2006 | Chew et al. | |
| 2009/0116241 A1 | 5/2009 | Ashoff et al. | |
| 2009/0135623 A1* | 5/2009 | Kunimochi | 362/608 |
| 2010/0061116 A1* | 3/2010 | Liu | 362/606 |
| 2010/0107463 A1 | 5/2010 | Spiro | |
| 2010/0245718 A1 | 9/2010 | Nishino et al. | |
| 2011/0001901 A1* | 1/2011 | Solomon et al. | 349/65 |

FOREIGN PATENT DOCUMENTS

| | | |
|---|---|---|
| EP | 0751340 B1 | 5/2000 |
| EP | 2081079 A2 | 7/2009 |
| GB | 2436611 A | 3/2007 |
| JP | 2000171641 A | 6/2000 |
| WO | 2008007315 A1 | 1/2008 |
| WO | 2009098809 A1 | 8/2009 |
| WO | 2009145548 A2 | 12/2009 |
| WO | 2010017087 A1 | 2/2010 |

* cited by examiner

*Primary Examiner* — Meghan Dunwiddie

(57) ABSTRACT

A light-emitting device which has a plate-shaped light guide (102) having front and rear surfaces (106, 108), being major surfaces, and edge surfaces (110, 112, 114, 116); and a light source (104) arranged at the plate-shaped light guide at such a position that the generated light is entered into the plate-shaped light guide and propagates in a substantial direction of propagation that is parallel with the front surface. At least a portion of the plate-shaped light guide includes a three-dimensional surface structure (118) arranged to provide a controlled light output through at least one of the front and rear surfaces and at least one of the edge surfaces. The controlled light output is controlled in terms of light output characteristics.

7 Claims, 3 Drawing Sheets

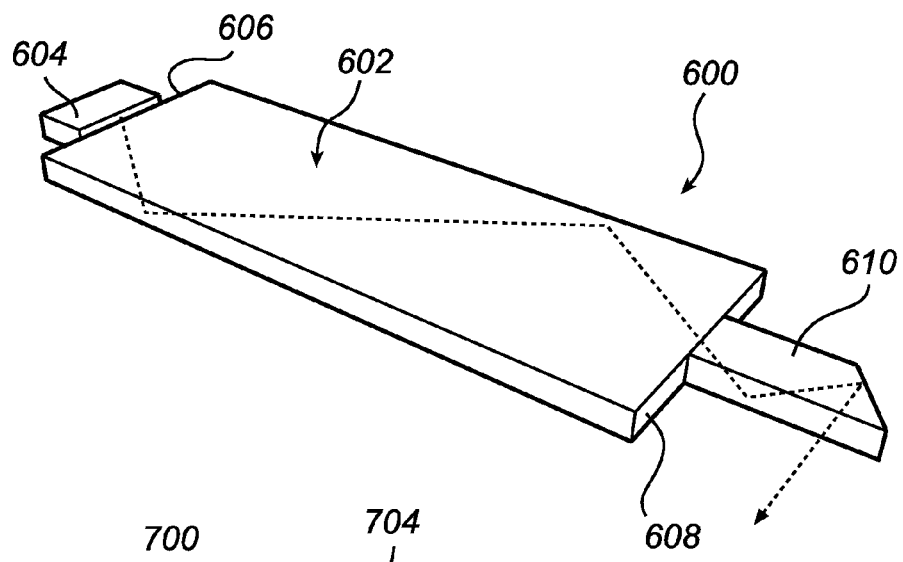
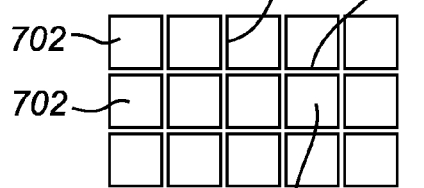
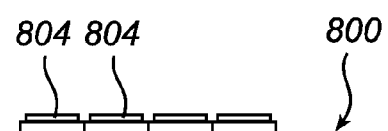
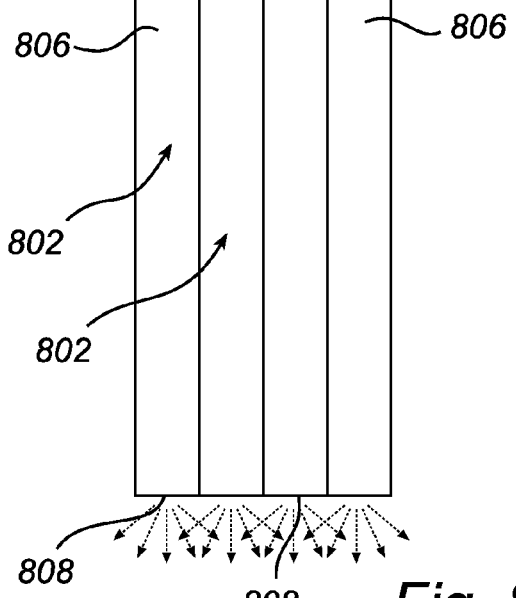

LIGHT-EMITTING DEVICE FOR EMITTING DIFFUSE LIGHT

FIELD OF THE INVENTION

The present invention relates to a light-emitting device comprising a plate-shaped light guide having a front surface, a rear surface, and edge surfaces; and a light source arranged at the plate-shaped light guide at such a position that the generated light is entered into the light guide and propagates in a substantial direction of propagation that is parallel with the front surface, wherein the light guide is arranged to direct a part of the propagating light out of the front surface.

BACKGROUND OF THE INVENTION

A typical prior art plate-shaped light-emitting device of the kind defined above is called a light guide plate, and has an edge-mounted light source and a rear surface that is provided with a light-refracting and light-reflecting structure, which redirects the light out of the front surface of the light guide plate. An example of such a light guide plate is disclosed in US-2010/0245718. A light source is arranged at an edge surface of the light guide. Due to total internal reflection, the light propagates with a main direction of propagation in parallel with the front and rear surfaces, which are the major surfaces of the light guide. However, the rear surface of the light guide is provided with a three-dimensional structure, and more particularly wedge shaped portions, which inhibits the total internal reflection and refracts the light out of the front surface of the light guide plate. A reflecting layer arranged on the rear surface of the light guide assures that any rearly refracted light is reflected out through the front surface of the light guide plate. In this prior art example, the light guide plate is used as a backlight in an LCD TV screen. That is a typical use of light guide plates, and another example is a mobile telephone display, and more general any type of LCD screen, large or small. The three-dimensional structure can also be provided at the front surface, while still refracting light out of the front surface. Examples of three-dimensional structures are knobs, pits, or dots of white paint. Another kind of application is in aesthetic applications. In the latter case, the light guide plates are often used in common arranged adjacent to each other in order to form one larger light-emitting surface.

Over the years large efforts have been invested in trying to couple out as much light as possible through the front surface and minimising the loss of light in other directions.

SUMMARY OF THE INVENTION

In accordance with an aspect of the present invention, there is provided a light-emitting device comprising a plate-shaped light guide having a front surface, a rear surface, which are major surfaces, and edge surfaces. The light-emitting device further comprises a light source arranged at the plate-shaped light guide at such a position that light generated by the light source is entered into the plate-shaped light guide and propagates in a substantial direction of propagation that is parallel with the front surface. The plate-shaped light guide is arranged to direct a part of the propagating light out of the front surface. At least a portion of the plate-shaped light guide comprises a three-dimensional surface structure arranged to provide a controlled light output through at least one of the edge surfaces, wherein the controlled light output is controlled in terms of light output characteristics.

In accordance with another aspect of the invention there is provided a light-emitting system comprising a plurality of light-emitting devices according to any one of the preceding claims, which light-emitting devices are arranged adjacent to each other.

Thus, according to the present invention light is output through at least one of the edge surfaces in addition to the front or rear surface output. The light output is controlled in such a way that predetermined desired light output characteristics, such as brightness, intensity, or angular distribution, are obtained. By using light-emitting devices according to this invention and arranging them to form the light-emitting system, a problem of contrast between adjacent light-emitting devices is solved. In other words, dark lines between the light-emitting devices are eliminated or reduced. In the prior art all efforts have been focused on minimizing "losses" through the edges, and the problem of contrasts at the interfaces between the plate-shaped light-emitting devices has not been thought of at all. Nowhere is there a discussion about the additional light output through at least one edge surface in a controlled way. There is no suggestion about making use of the possibility of actually letting some light pass to an edge surface in conjunction with still letting the front surface be the main light output surface.

In GB-2436611 a plate-shaped light guide is employed and light is admitted out of the edge surfaces. However, light is only or substantially output through the edge surfaces, while the major surfaces are covered with a reflective film. The purpose is only to provide single light-emitting devices, while there is no mentioning about problems occurring when putting several light-emitting devices together. Additionally, there is no teaching about providing a three-dimensional surface structure to obtain a controlled light output.

Furthermore, according to this invention, when using a single light-emitting device the controlled light output through at least one edge surface is employable, for instance, for obtaining an illumination of the surroundings, such as a wall or a ceiling, thereby creating a desirable overall light impression.

In accordance with embodiments of the light-emitting device, the three-dimensional structure is implemented as protrusions and/or recessions, which are advantageous as regards the controllability of the light refraction and reflection.

In accordance with an embodiment of the light-emitting device, it is arranged to create an atmosphere in a room where it is used. By atmosphere is meant an impression of the light setting in the room, which for instance can be obtained by a combination of light directed towards multiple parts of the room, by means of front surface light output and edge surface light output.

In accordance with an embodiment of the light-emitting device, the controlled light output is arranged to illuminate a surrounding of the light-emitting device, which is advantageous for e.g. applications where the light-emitting device is used for lighting up a wall or a ceiling or objects in a room.

In accordance with an embodiment of the light-emitting device, one of the front, rear and edge surfaces is provided with a protrusion having a free end that is inclined in relation to that surface. The angle of inclination is chosen such that light is output through the inclined surface. This embodiment is employable for more specifically directed light applications, wherein at least a part of the light output is provided through the inclined free end of the protrusion.

In an embodiment of the light-emitting system, the light-emitting devices are strip shaped and arranged side-by-side. A typical implementation of this embodiment is a so called curtain with light input at upper ends of the strips and light output at the lower ends thereof, as well as at the longitudinal edges thereof, or combinations with light output from the front surfaces of the strips.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which:

FIG. 6 is a perspective view from above showing another embodiment of a light-emitting device;

FIGS. 7 and 8 are front views showing embodiments of a light-emitting system.

DESCRIPTION OF PREFERRED EMBODIMENTS

Figure 1:
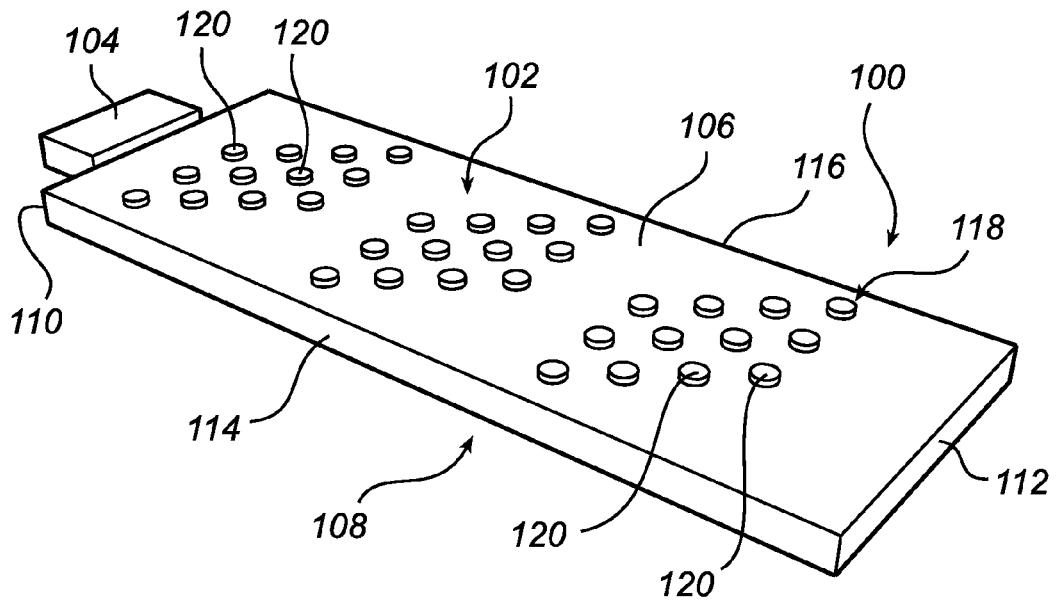
FIG. 1 is a perspective view from above showing an embodiment of a light-emitting device according to the present invention.
Figure 2:
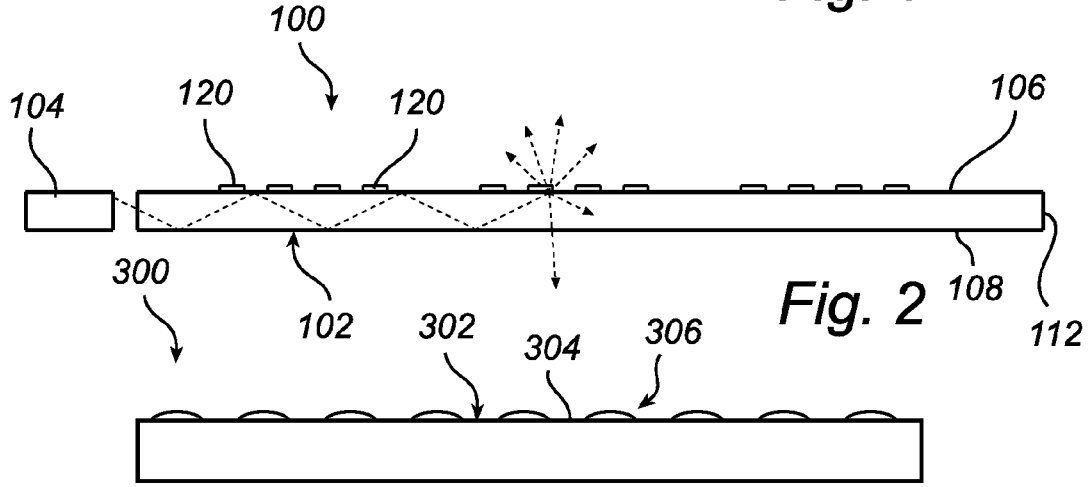
FIG. 2 is a longitudinal sectional view of the embodiment shown in FIG. 1.
Figure 3:
FIGS. 3-5 are longitudinal sectional views of parts of other embodiments of the light-emitting device.

Referring to FIGS. 1 and 2, a light-emitting device 100 comprises a plate-shaped light guide 102, also called light guide plate, and a light source 104. The light guide 102 is made of an ordinary light guiding material, such as glass or a transparent plastic. The light guide 102 is block shaped and has a front surface 106, and an opposite rear surface 108, which surfaces constitute the major surfaces of the light guide 102. Further, the light guide has a first edge surface 110, constituting a short side edge surface, a second edge surface 112 opposite to the first edge surface 110, a third edge surface 114, constituting a long side edge surface, and a fourth edge surface 116, opposite to the third edge surface. The light source 104 is arranged adjacent to the first edge surface 110 and emits light through the first edge surface 110 into the light guide 102. The generated light propagates in a substantial direction of propagation that is parallel with the front surface 106, as shown in FIG. 2. As commonly known to the person skilled in the art, due to a small enough angle of incidence towards the front and rear surfaces 106, 108, and towards the third and fourth edge surfaces 114, 116 of the light guide 102, total internal reflection of the light is obtained. However, the light guide 102 is provided with a three-dimensional surface structure 118 consisting of protrusions, and more particularly consisting of white dots of paint 120 arranged on the front surface 106. The dots of paint causes light rays to be scattered, and inhibits the total internal reflection. Some light rays will exit through the white paint, others will be reflected rearwards out of the rear surface 108. But light will also be scattered in other directions, thereby causing it to exit through one or more of the edge surfaces 110, 112, 114, 116. By providing the dots of paint 120 at a specific density, size, and position the light output characteristics of the light output through different edge surfaces is controlled to achieve a desired light output. Generally, when using white dots of paint, the light output through the front and rear surfaces 106, 108 will be approximately lambertian, whereby the light guide 102 appears equally bright from every angle. By providing a high enough density of dots of paint 120 on the front surface 106 a substantial and smooth light output through the front surface 106 is achieved, while obtaining a desired light output through edge surfaces as well. It should be noted that if desired the light-emitting device can include a light reflective layer applied on the rear surface 108 of the light guide 102. Optionally, further surfaces can be covered by a light reflective layer, except for those useful for the illuminative purposes of the particular application.

According to an optional embodiment of the light-emitting device 100, the front surface 106 is provided with recesses instead of protrusions, or in combination with protrusions. For instance, the recesses consist of scratches in the front surface 106. By using a laser to burn off material from the front surface, it is possible to most accurately form the recesses in order to direct the scattered light as desired.

Figure 4:
Figure 5:
Figure 9:
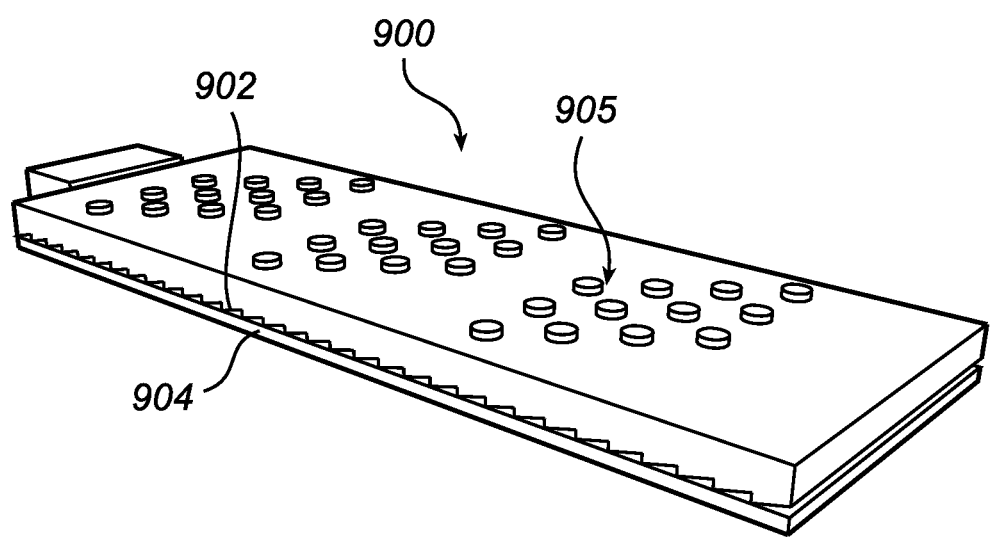
FIG. 9 is a perspective view from above showing another embodiment of the light-emitting device.

According to another embodiment of the light-emitting device 300, a three-dimensional micro structure of protrusions and/or recesses is provided on the front surface 304 of the light guide 302. The term "micro" indicates that the individual elements of the structure are far smaller than the above dots of paint and scratches. Nevertheless they have the corresponding effect. Many different kinds of regular, predefined micro structures are feasible, such as protruding bumps 306, recesses 406, see FIG. 4, or wedge shaped portions 506, see FIG. 5. The possibilities of varying the structure are vast. They all have specific characteristics of the light output, in terms of percentage of light amount emitted through each surface as well as in terms of angular characteristics, i.e. the direction of the scattered/reflected light relative to the front surface. Further examples of three-dimensional structures are pyramidal recesses, which would cause light output through all surfaces of the light guide.

According to another embodiment of the light-emitting device 600, comprising a plate-shaped light guide 602 and a light source 604, arranged at a first edge surface 606, one of the other surfaces is provided with a protrusion having a free end that is inclined in relation to that surface. More particular, in an exemplary case, the protrusion 610 protrudes from a second edge surface 608 opposite to the first edge surface 606. The protrusion 610 is elongated and the width of the protrusion 610 is substantially less than that of the rest of the light guide 602. The free end of the protrusion 610 is inclined in relation to the second edge surface 608, for example at 45 degrees. That causes the light reaching the free end to be reflected by the inclined surface and output through a side surface of the protrusion. Many other arrangements of the protrusion are possible. For instance, the protrusion may be arc-shaped. As long as a large enough radius of curvature is employed, the light will stay inside of the protrusion on its way to the inclined end surface.

The light-emitting devices according to the present invention may be arranged to be combined into larger structures, which are herein called light-emitting systems. According to one embodiment of such a light-emitting system 700 it comprises several light-emitting devices, which have been mounted adjacent to each other to form a larger rectangular luminous surface. The light-emitting devices are provided with three-dimensional structures, which direct light out of the edge surfaces in a controlled way, at least those edge surfaces which are neighbouring edge surfaces of other light-emitting devices 702. Thereby, the interfaces 704 between the light-emitting devices 702 are lit up, which eliminates or reduces contrasts, such as dark lines that would otherwise have been seen between the light-emitting devices 702.

In another embodiment of the light-emitting system 800, it comprises several strip-shaped light-emitting devices 802 arranged side by side, and hanging to form a curtain. The light sources 804 are arranged at the top edge surfaces of the strips 802 and by means of three-dimensional surface structures light is output through the front surfaces 806 and through the bottom edge surfaces 808. The light output at the bottom edge surfaces 808 illuminates the floor and gives an illusion of sun light shining in through a window behind the curtain. In addition light can be output through the side surfaces as well and with an increased brightness in order to intensify the impression of sun light behind the curtain 800.

It is also possible to provide a light-emitting device 900 having a surface structure which is a combination of a rear surface refracting structure 902, and possible reflective rear surface covering layer 904, and an additional front surface structure 906.

It should be noted that the figures are significantly enlarged as regards the thickness of the light-emitting device. In reality, typical thicknesses are in the millimeter range, where the light guide often is only about one millimeter thick.

Above, embodiments of the light-emitting device and light-emitting system according to the present invention as defined in the appended claims have been described. These should be seen as merely non-limiting examples. As understood by a skilled person, many modifications and alternative embodiments are possible within the scope of the invention.

For example, as an alternative to arranging the light source at an edge surface of the light guide, for some applications it is possible to form a recess in the light guide at one of the front and rear surfaces, and insert the light source into the recess, emitting light in a circle sector or all full circle.

As regards the shape of the light guide other basic shapes than rectangular are possible, such as polygonal or circular.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A light-emitting system comprising:
a plurality of light-emitting devices arranged adjacent to each other, wherein each of the plurality of light-emitting devices comprises a plate-shaped light guide having front and rear surfaces, being major surfaces, and edge surfaces, each of the edge surfaces being distinct from said major surfaces; and
one or more light sources arranged at such a position relative to the plurality of light-emitting devices that the generated light is entered into the plate-shaped light guides and propagates in a substantial direction of propagation that is parallel with the front surfaces,
wherein at least a portion of each plate-shaped light guide comprises a three-dimensional surface structure arranged to provide a controlled light output through at least one of the edge surfaces and at least one of the front and rear surfaces, and
wherein the controlled light output is controlled in terms of light output characteristics.

2. The light-emitting system according to claim 1, wherein the light-emitting devices are strip-shaped and arranged side-by-side.

3. The light-emitting system according to claim 1, wherein, for each light-emitting device, the controlled light output is provided through at least the edge surfaces that are located adjacent to edge surfaces of adjacent light-emitting devices in order to reduce contrast at the edges of the light-emitting devices.

4. The light-emitting system according to claim 1, wherein the three-dimensional surface structure comprises one or more protrusions.

5. The light-emitting system according to claim 1, wherein the three-dimensional surface structure comprises recesses.

6. The light-emitting system according to claim 1, wherein each of the one or more light sources is arranged at one of the edge surfaces of a plate-shaped light guide for generating light that enters that plate-shaped light guide through that edge surface.

7. A light-emitting system comprising:
a plurality of light-emitting devices arranged adjacent to each other, wherein each of the plurality of light-emitting devices comprises a plate-shaped light guide having front and rear surfaces, being major surfaces, and edge surfaces, each of the edge surfaces being distinct from said major surfaces; and
one or more light sources arranged at such a position relative to the plurality of light-emitting devices that the generated light is entered into the plate-shaped light guides and propagates in a substantial direction of propagation that is parallel with the front surfaces,
wherein at least a portion of each plate-shaped light guide comprises a three-dimensional surface structure located on at least one of its major surfaces, said three-dimensional surface structure arranged to provide a controlled light output through at least one of the edge surfaces and at least one of the front and rear surfaces,
wherein the controlled light output is controlled in terms of light output characteristics, and
wherein the light-emitting system is arranged to create an atmosphere in a room where it is used.

* * * * *